US008867986B1

(12) United States Patent
Tarpley, Jr.

(10) Patent No.: US 8,867,986 B1
(45) Date of Patent: Oct. 21, 2014

(54) ENHANCED MOBILE SATELLITE COMMUNICATION SYSTEM

(75) Inventor: Richard A. Tarpley, Jr., Cleveland, GA (US)

(73) Assignee: Pathfinder Digital, LLC, Cleveland, GA (US)

( * ) Notice: Subject to any disclaimer, the term of this patent is extended or adjusted under 35 U.S.C. 154(b) by 552 days.

(21) Appl. No.: 13/280,495

(22) Filed: Oct. 25, 2011

Related U.S. Application Data

(60) Provisional application No. 61/406,651, filed on Oct. 26, 2010.

(51) Int. Cl.
*H04B 7/185* (2006.01)
*H01Q 1/32* (2006.01)

(52) U.S. Cl.
USPC ...... 455/13.3; 455/12.1; 455/127.1; 343/713; 343/761

(58) Field of Classification Search
USPC ........... 455/3.02, 13.3, 13.4, 572, 127.1, 299, 455/12.1; 343/711, 713, 761, 880, 915
See application file for complete search history.

(56) References Cited

U.S. PATENT DOCUMENTS

| | | | | |
|---|---|---|---|---|
| 4,178,576 A * | 12/1979 | Schmidt et al. | ............ | 343/781 R |
| 4,545,782 A * | 10/1985 | Niemiro et al. | ................ | 493/425 |
| 4,683,475 A * | 7/1987 | Luly | .............................. | 343/915 |
| 5,337,062 A | 8/1994 | Sherwood et al. | | |
| 5,418,542 A | 5/1995 | Sherwood et al. | | |
| 5,545,109 A * | 8/1996 | Hayakawa | ..................... | 477/178 |
| 5,886,424 A * | 3/1999 | Kim | ................................. | 307/64 |
| 5,929,817 A * | 7/1999 | Clark | ............................. | 343/713 |
| 6,059,727 A * | 5/2000 | Fowlkes et al. | ................ | 600/443 |
| 6,373,376 B1 * | 4/2002 | Adams et al. | .................. | 370/445 |
| 7,050,891 B2 * | 5/2006 | Chen | ................. | 701/23 |
| 7,090,287 B1 * | 8/2006 | Eberst | ........................ | 296/180.1 |
| 7,358,620 B2 * | 4/2008 | Melfi | .............................. | 290/1 A |
| 7,911,810 B2 * | 3/2011 | Shimada et al. | ................. | 363/17 |
| 8,022,570 B2 * | 9/2011 | Flickinger et al. | ............ | 307/10.8 |
| 8,264,188 B2 * | 9/2012 | Veik | ................................. | 318/599 |
| 8,368,606 B1 * | 2/2013 | Haugan | .......................... | 343/713 |
| 8,719,597 B2 * | 5/2014 | Liu et al. | ........................ | 713/300 |
| 2002/0145894 A1 * | 10/2002 | Chen | ................................. | 363/65 |
| 2002/0181254 A1 * | 12/2002 | Drobnik | ........................... | 363/37 |
| 2004/0203701 A1 * | 10/2004 | Wilson | ......................... | 455/422.1 |
| 2005/0113690 A1 * | 5/2005 | Halmann et al. | ............... | 600/437 |
| 2007/0127185 A1 * | 6/2007 | Watanabe | ...................... | 361/143 |
| 2008/0055170 A1 * | 3/2008 | Madden et al. | ................. | 343/713 |
| 2008/0074578 A1 * | 3/2008 | Kwon et al. | ..................... | 349/61 |
| 2008/0246842 A1 * | 10/2008 | Inoue | .............................. | 348/143 |
| 2009/0212735 A1 * | 8/2009 | Kung et al. | ..................... | 320/101 |
| 2010/0128504 A1 * | 5/2010 | Lee et al. | .......................... | 363/89 |
| 2011/0115302 A1 * | 5/2011 | Slota et al. | ........................ | 307/87 |
| 2011/0148204 A1 * | 6/2011 | DiMarco et al. | ................ | 307/65 |
| 2011/0284334 A1 * | 11/2011 | Cheng | .......................... | 190/18 A |

* cited by examiner

*Primary Examiner* — Dominic E Rego
(74) *Attorney, Agent, or Firm* — The Van Winkle Law Firm; David M. Carter

(57) ABSTRACT

There is provided a mobile satellite communication terminal system including a transmit/receive sub-system. The transmit/receive sub-system includes an antenna dish, a feed boom assembly, and a power supply unit having a first power input adapted to receive alternating current power and a second power input adapted to receive direct current power. The power supply unit is able to operate on either alternating current or direct current for supplying power to the transmit/receive sub-system. The power supply unit is received in a grip case. A transport container is provided. The antenna dish, the feed boom assembly, and the grip case are received in the transport container.

4 Claims, 23 Drawing Sheets

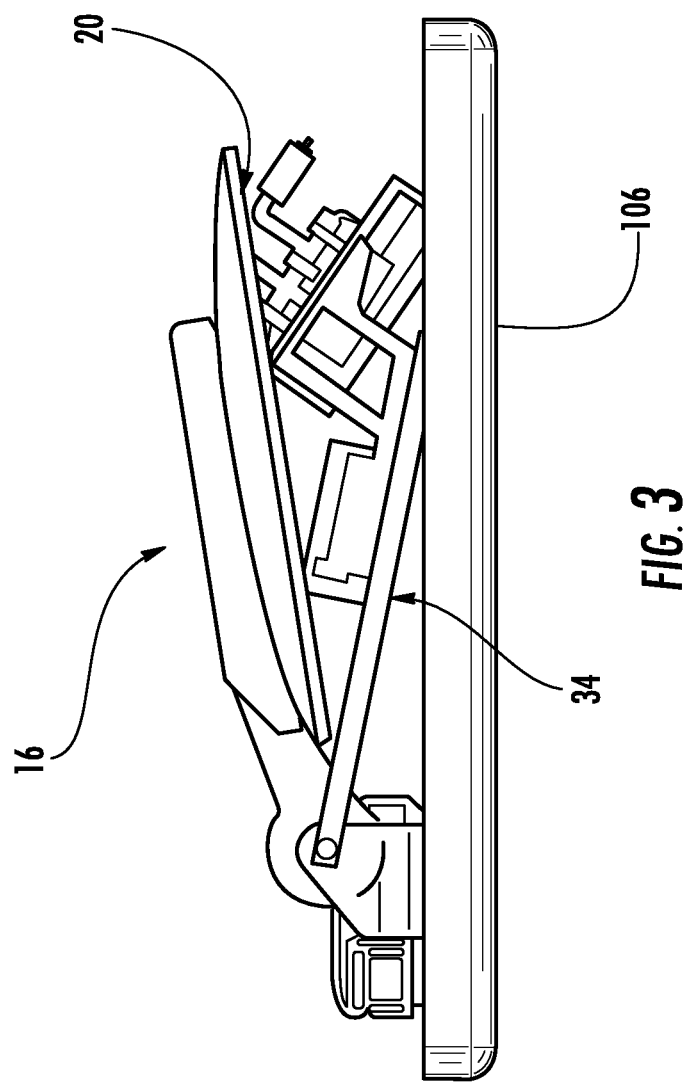

ENHANCED MOBILE SATELLITE COMMUNICATION SYSTEM

RELATED APPLICATION

This is a U.S. non-provisional application relating to and claiming the benefit of U.S. Provisional Patent Application Ser. No. 61/406,651 filed Oct. 26, 2010.

BACKGROUND OF THE INVENTION

A mobile satellite antenna is particularly suited for high bandwidth communication between a remote location and a satellite. For example, commercial users such as those found in the oil and gas industry can advantageously deploy a mobile satellite antenna where use locations are far apart. Additionally, some users of mobile satellite antennas require high speed deployment of the satellite antenna such as, for example, users in the law enforcement community with tactical communications vehicles. Military and homeland security units also desire a mobile satellite antenna that is configured as a high bandwidth uplink/downlink mobile satellite antenna system that can be quickly disassembled, stowed, and transported to another location.

There have been a number of satellite antenna systems that have been commercially offered and which have had antenna dishes and other components that folded down when not in operation. For example, some such satellite antenna systems have been offered that included gear boxes to elevate the dish through a rotary drive motion or included a linear actuator attached to the back of the satellite dish to raise the dish. In addition, configurations for satellite antenna systems deploying such dish raising and lowering mechanisms can be seen in U.S. Pat. Nos. 5,337,062 and 5,418,542.

Several satellite antenna systems have being provided with a mobility capability in that these satellite antenna systems can be stowed or packaged in a number of transit cases (often three or more transit cases per system). These systems are generally used for a variety of different types of communications scenarios, meaning that in some cases excess equipment is transported in the missions. The transfer or transport of a number of cases raises the likelihood of equipment getting lost or misplaced and these systems tend to be less robust in the sense that damaged or broken parts occur that tend to degrade performance. In addition, assembly and disassembly of the system in the field can be time consuming when, often, time is of the essence. Also, users of these systems must ensure that the vehicle or place of usage is equipped with a certain type of power source as these systems are typically configured to be powered by a pre-selected power source.

Thus, there continues to be a need to improve the versatility of mobile satellite antenna systems and to lessen the chances for incompatible power input situations. Additionally, there continues to be a need for a mobile satellite antenna system that lessens the chances for incompatible power input situations and that is readily deployable from a stowed position to a usable deployed position as quickly as possible and that is configured to be quickly disassembled, stowed and transported to another location.

SUMMARY OF THE INVENTION

The present invention provides a mobile satellite communication system that improves the versatility of the mobile satellite antenna system product range and lessens the chances for incompatible power input situations. Additionally, the present invention provides a mobile satellite antenna system that lessens the chances for incompatible power input situations and is readily and quickly deployable from a stowed position to a usable deployed position and that is configured to be quickly disassembled, stowed and transported to another location. Moreover, according to one aspect of the present invention, the present invention provides a mobile satellite communication system that includes test sample ports to allow for easy system monitoring or troubleshooting, thereby remediating a disadvantage of known systems that do not allow for easy system monitoring or troubleshooting, and which require external devices to connect into the system if the user needs to monitor.

According to one form of the present invention, there is provided a mobile satellite communication terminal system including a transmit/receive sub-system. The transmit/receive sub-system includes an antenna dish, a feed boom assembly, and a power supply unit. The power supply unit having a first power input adapted to receive alternating current power and a second power input adapted to receive direct current power. The power supply unit being able to operate either on alternating current or direct current for supplying power to the transmit/receive sub-system. A transport container is provided and receives the antenna dish, the feed boom assembly, and the power supply unit.

According to another form of the present invention, there is provided a mobile satellite communication terminal system including an antenna dish, a feed boom assembly, a power supply unit, and a grip case. The power supply unit is received in the grip case. A transport container is provided. The transport container receives the antenna dish, the feed boom assembly, and the grip case whereby the system may be efficiently and conveniently stored, transported, assembled for operation, and disassembled for transport.

According to yet another form of the present invention, there is provided a mobile satellite communication terminal system including a transmit/receive sub-system. The transmit/receive sub-system includes an antenna dish, a feed boom assembly, and a power supply unit. The power supply unit has a first power input adapted to receive alternating current power and a second power input adapted to receive direct current power. The power supply unit is able to operate using either alternating current or direct current for supplying power to the transmit/receive sub-system. The power supply unit has at least one switch to enable the user to switch from the first power input to the second power input and from the second power input to the first power input. The power supply unit includes an electrical circuit which enables the power supply unit to operate on the appropriate input current, notwithstanding the state of the switch. The system further includes a grip case. The power supply unit is received in the grip case. A transport container is further provided. The grip case, the antenna dish, and the feed boom assembly are received in the transport container. The transport container includes a tray forming the bottom of the container and a cover forming the top and sides of the container. The antenna dish and the feed boom assembly are mounted on the tray. The grip case is mounted on the inside of the container.

According to one feature of the one aspect of the invention, there is provided a mobile satellite communication terminal system wherein the transport container includes a separate mounting for stowage and transport of the power supply unit and a different mounting for the antenna dish and feed boom assembly.

According to another feature of the one aspect of the invention, there is provided a mobile satellite communication terminal system wherein the antenna dish and feed boom assembly are commonly mounted to a portion of the transport container for deployment as a single unit between a transport ready disposition and a fully deployed disposition.

According to yet another feature of the one aspect of the invention, there is provided a mobile satellite communication terminal system wherein the transmit/receive sub-system includes an antenna controller, and the antenna controller and the power supply unit are commonly mounted in a hand grip case.

According to another feature of one aspect of the invention, there is provided a mobile satellite communication terminal system wherein all of the components are housed in the same container which meets predetermined weight and size requirements.

BRIEF DESCRIPTION OF THE DRAWINGS

FIG. 3 is a side elevational view of the tray portion of the transport container of FIG. 2 in an undeployed position.

DETAILED DESCRIPTION OF AN EMBODIMENT

Schematic Overview of the SatCom Terminal

Figure 1:
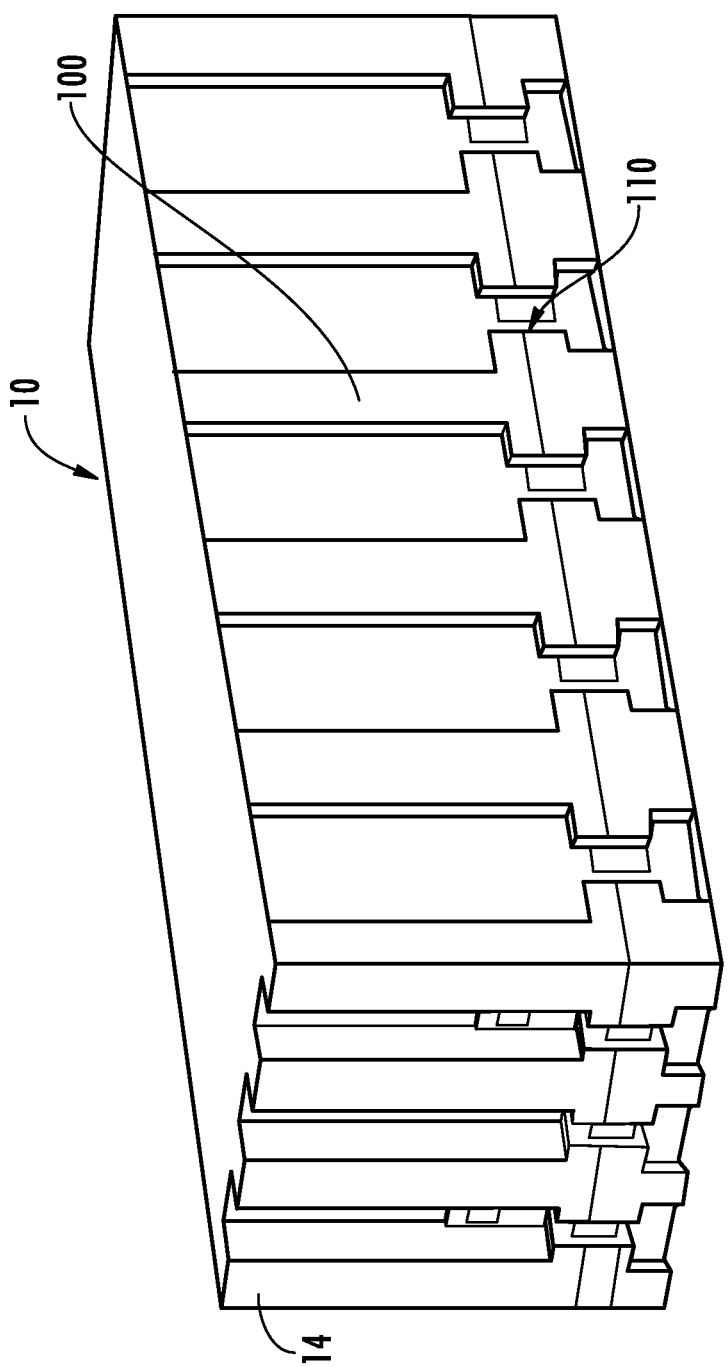
FIG. 1 is a perspective view of one embodiment of the transport container of the SatCom terminal in its transport ready disposition.
Figure 2:
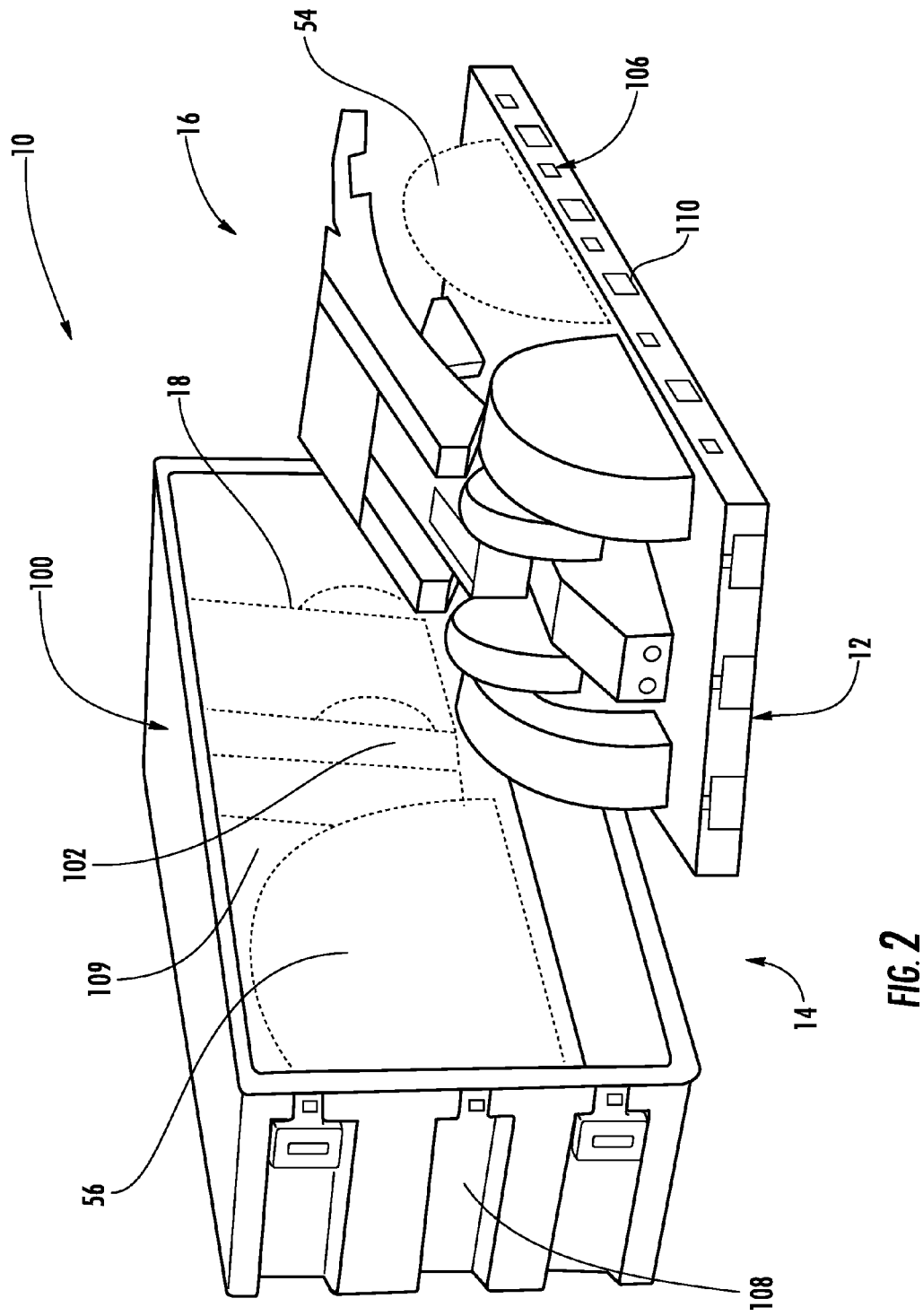
FIG. 2 is a perspective view of the tray portion of the transport container of FIG. 1 and a rectangular cover portion dismounted from the tray portion.

With reference now to FIGS. 1-17, one embodiment of the mobile satellite communication system of the present invention will be described and is generally designated, as seen in FIG. 1, as a SatCom terminal 10. As seen in FIG. 2, the SatCom terminal 10 includes a transmit/receive sub-system 12 and a transport container 14. The transport container includes tray 106 and cover 108. The transmit/receive sub-system 12 comprises an antenna dish and feed boom assembly, hereinafter sometimes designated as the tray mounted unit 16, and a grip case 18 having a power supply unit (PSU) 13 and an antenna controller assembly 46, shown in FIG. 10, received in the grip case. The transport container 14 is specially configured to stow and carry the grip case 18 in a secure mounting and to stow and carry the tray mounted unit 16 in a secure mounting.

The SatCom terminal 10 is advantageously suited for use for transmitting and receiving signals from a satellite (not shown) or other signal sources. As will be further described hereinafter, the SatCom terminal 10 comprises components for the set up and operation of the tray mounted unit 16, and power supply 13 in the grip case 18 advantageously provides a configuration for coupling the tray mounted unit 16 to any of a number of suitable power inputs such as, for example, an alternating current (AC) power input or a direct current (DC) power input. These components may be suitably configured to operate compatibly with other hardware interfaces and software controls to fully enhance the capability of the SatCom terminal 10 to broadcast and receive signals.

While the SatCom terminal 10 can be configured in accordance with the principles of the present invention to provide the superior performance, convenience, and transport capabilities that will be described hereinafter, one embodiment of the SatCom terminal 10 will now be further described with specific reference to the SatCom terminal 10 configured as a satellite communication (SatCom) terminal designed for specific higher data rate applications, wherein the SatCom terminal is a very small aperture terminal (VAST) having mobile capabilities (MVSAT).

Overview of the Tray Mounted Unit

Figure 4:
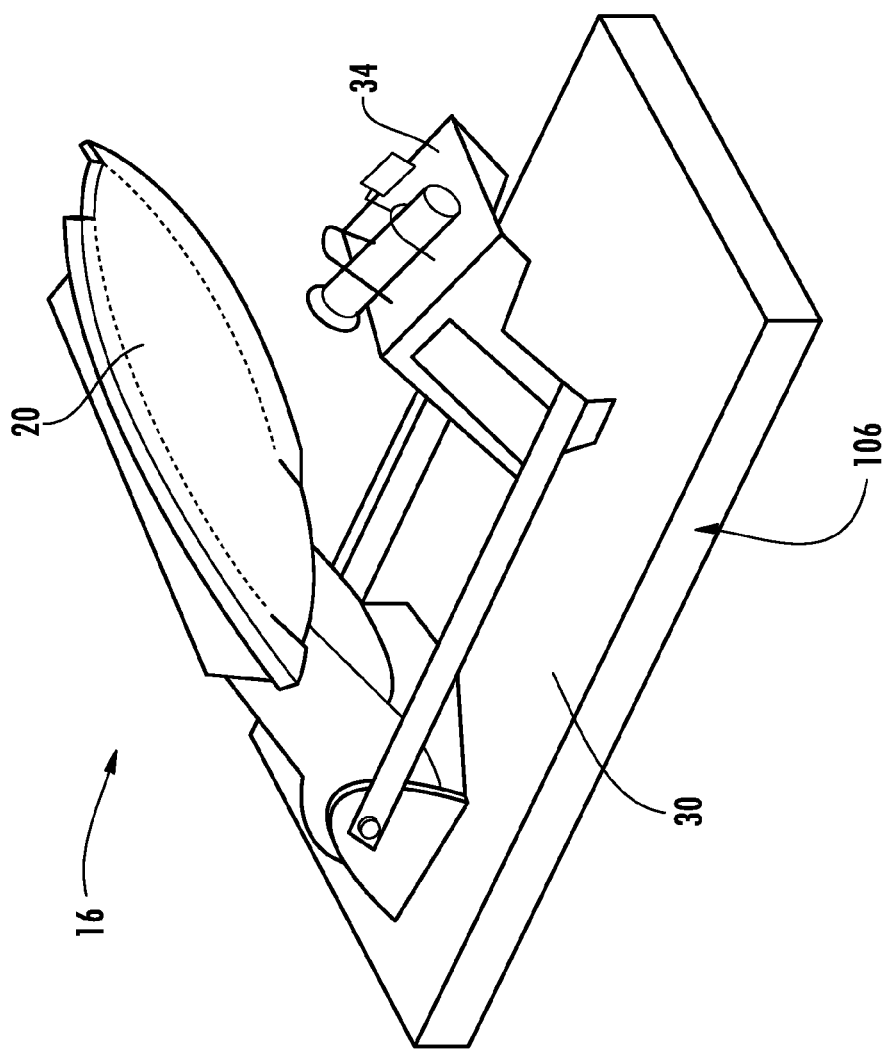
FIG. 4 is a perspective view of the tray mounted unit of FIG. 2 in a partially deployed position.
Figure 5:
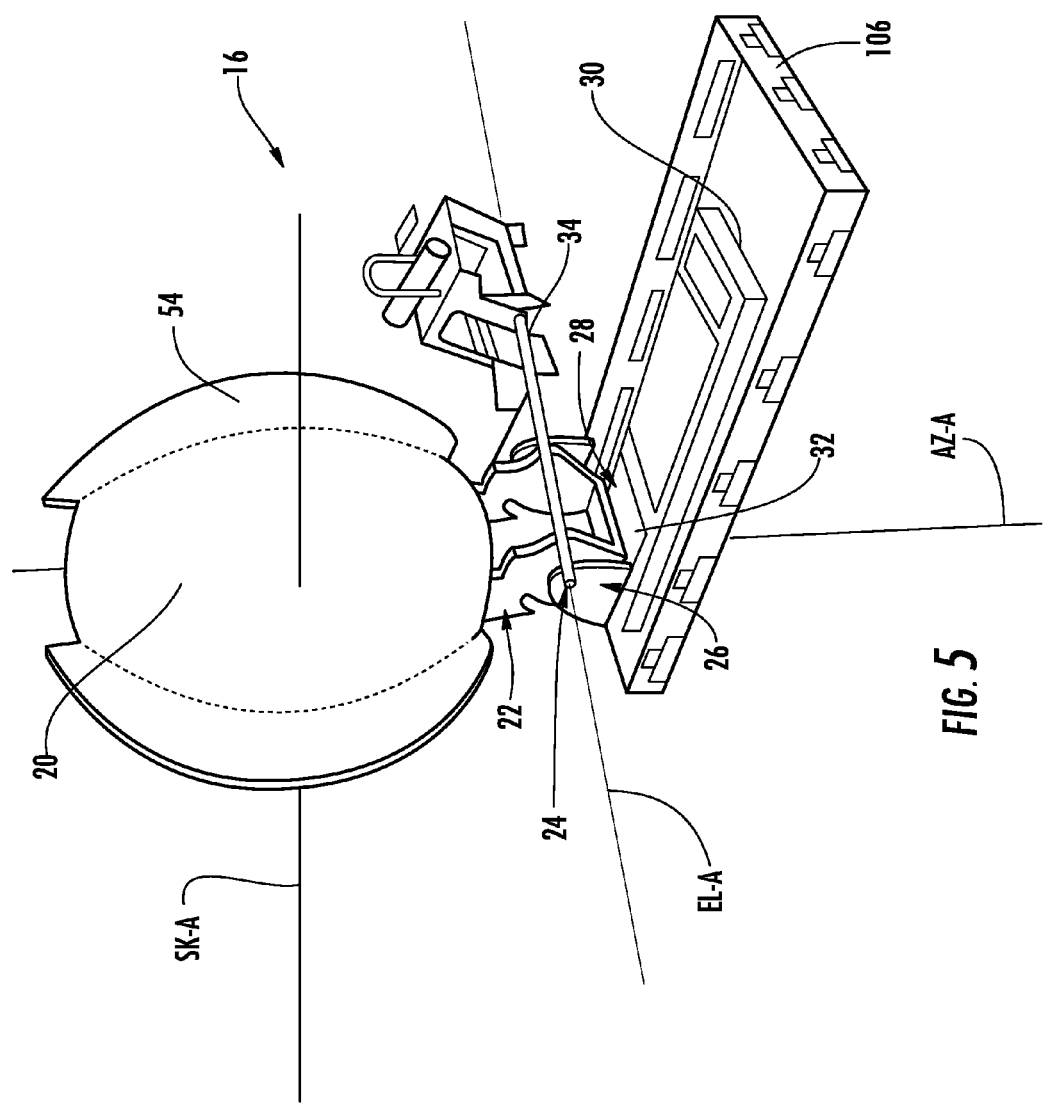
FIG. 5 is a perspective view of the tray mounted unit of FIG. 2 in its fully deployed position.
Figure 6:
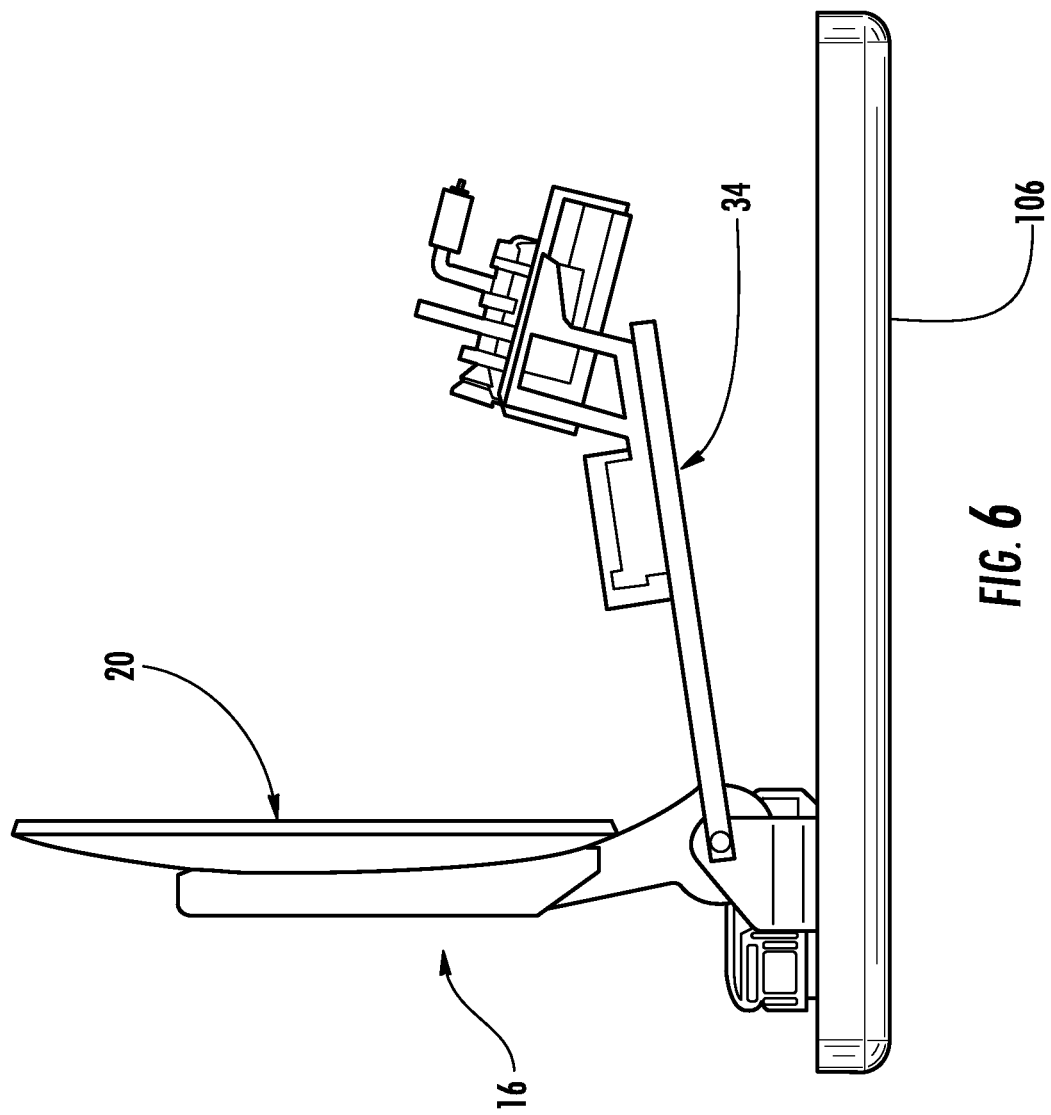
FIG. 6 is a side elevational view of the tray mounted unit of FIG. 2 in its fully deployed position.

Reference is now had to FIGS. 1-6 which collectively illustrate in "snapshot" manner a transformation of the SatCom terminal 10 from its transport ready disposition as shown in FIG. 1 to its fully deployed disposition as shown in FIGS. 5 and 6. As seen in FIG. 1, which is a perspective view of the transport container 14, the SatCom terminal 10 in its transport ready disposition is comprised of the transport container 14 housing therein the tray mounted unit 16 and the grip case 18 (not shown in FIG. 1). As seen in FIG. 2, which is a perspective view of the tray portion 106 of the transport container 14 on which the tray mounted unit 16 is mounted and cover 108, and in FIG. 3, which is a side elevational view of the tray portion 106 of the transport container 14 on which the tray mounted unit 16 is mounted, the tray mounted unit 16 being in a stow-ready position, and cover 108. As seen in FIG. 4, which is a perspective view of the tray mounted unit 16 in a partially deployed position, the tray mounted unit 16 is shown in an intermediate position in which the tray mounted unit 16 is being deployed from its stow-ready position shown in FIG. 2 to the fully deployed transmit-receive position shown in FIG. 5. As seen in FIG. 5, which is a perspective view of the tray mounted unit 16 in its fully deployed position, and as seen in FIG. 6, which is a side elevational view of the tray mounted unit 16 in its fully deployed position, the tray mounted unit 16 includes a dish 20 mounted on a parallel post support 22 and the parallel post support 22 is pivotally connected for rotation about an elevation axis EL-A, as shown in FIG. 5, via a pair of fulcrum elements 24. The fulcrum elements 24 are each mounted on a respective one of a pair of dog ear flanges 26 that extend upwardly from a turntable 28. The turntable 28 is pivotally mounted to a sled track pair 30 via a turntable rotation collar 32 such that the turntable 28, and the dish 20 supported thereon, can rotate about an azimuth axis AZ-A that is perpendicular to the elevation axis EL-A. Although the tray mounted unit 16 described herein does not comprise a separate assembly for moving the dish 20 about a skew axis SK-A perpendicular to the elevation axis EL-A and the azimuth axis AZ-A, the present invention contemplates that a suitable skew movement drive arrangement and controller can be provided.

Figure 7:
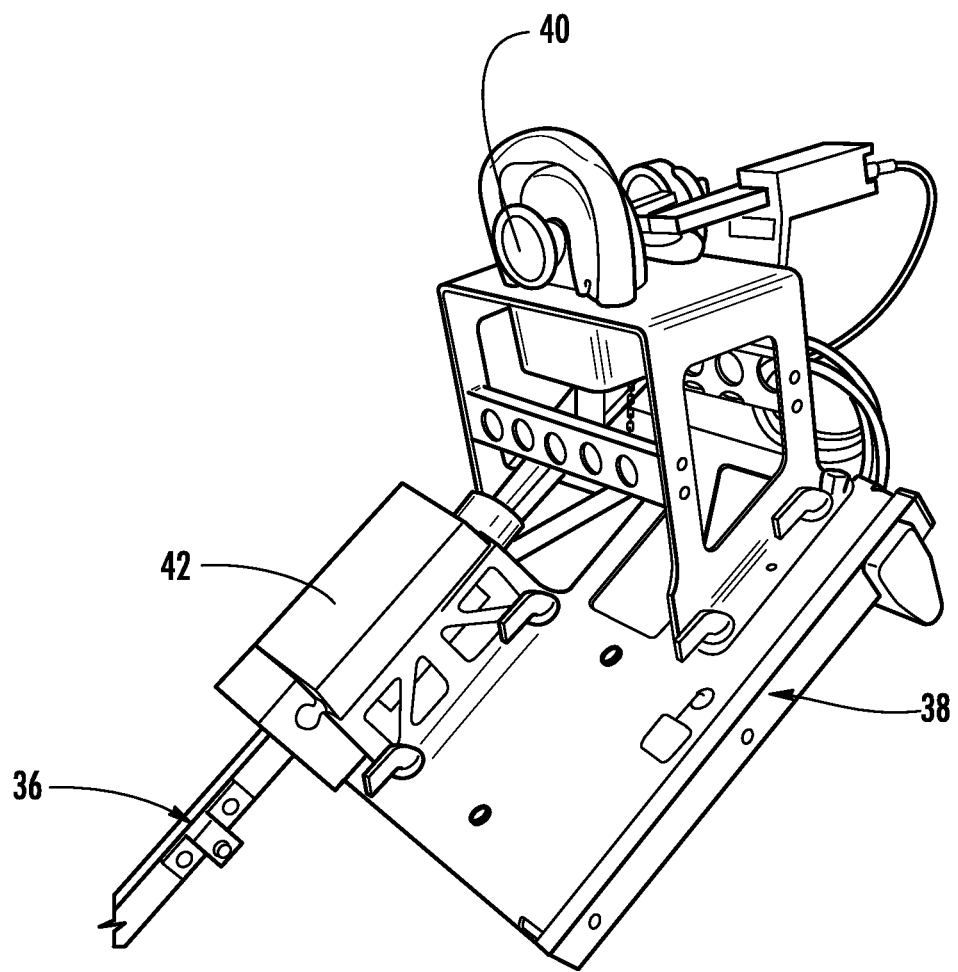
FIG. 7 is a perspective view of a top end of the feed boom of the tray mounted unit of FIG. 2.

The tray mounted unit 16 also includes a feed boom 34 which is comprised of a pair of parallel support legs 36 pivotally mounted to the dog ear flanges 26 via the fulcrum element 24 for limited pivoting of the feed boom 34 about the elevation axis EL-A. As seen in FIG. 7, which is a perspective view of a top end of the feed boom of the tray mounted unit, the parallel support legs 36 of the feed boom 34 are connected to one another via a top end plate 38 on which a block upconverter (BUC) 40 and an low noise block LNB 42 are mounted. The low noise block LNB 42 is a converter that amplifies and converts a wide block (band) of frequencies. As seen in FIG. 4, the feed boom 34 can be pivoted upwardly from its stow-ready position as shown in FIG. 2 to ultimately reach a position, as shown in FIGS. 5 and 6, in which the feed boom 34 supports the block upconverter BUC 40 and the low noise block LNB 42 in their respective operating positions relative to the dish 20. The tray mounted unit 16 is provided with custom L-Band interface and sample ports including a Custom L-Band interface and sample ports on the base of the tray mounted unit 16 comprising: a 50 ohm RF Cable Assembly, a TNC Female TX Interface Port, a N Female RX Interface Port, a BNC Female RX Sample Port, and a BNC Female TX Sample Port. Sample ports as integrated are to provide a test point for the L-Band signal at the input of the block upconverter 40 BUC and the output of the low noise block LNB 42.

Overview of the Transport Container

Figure 7A:
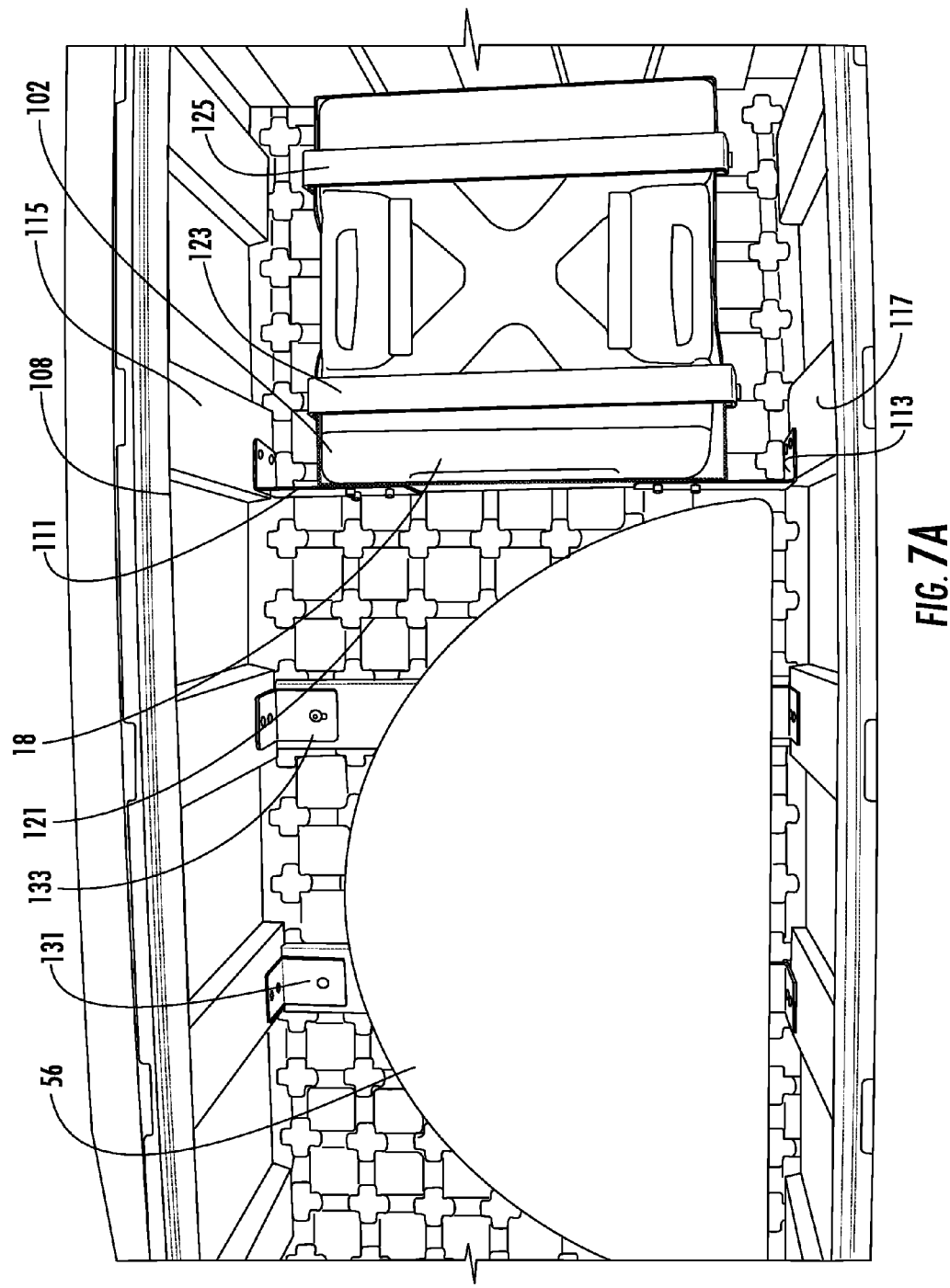
FIG. 7A is a perspective view of the inside of the cover of the transport container with items mounted thereto.
Figure 8:
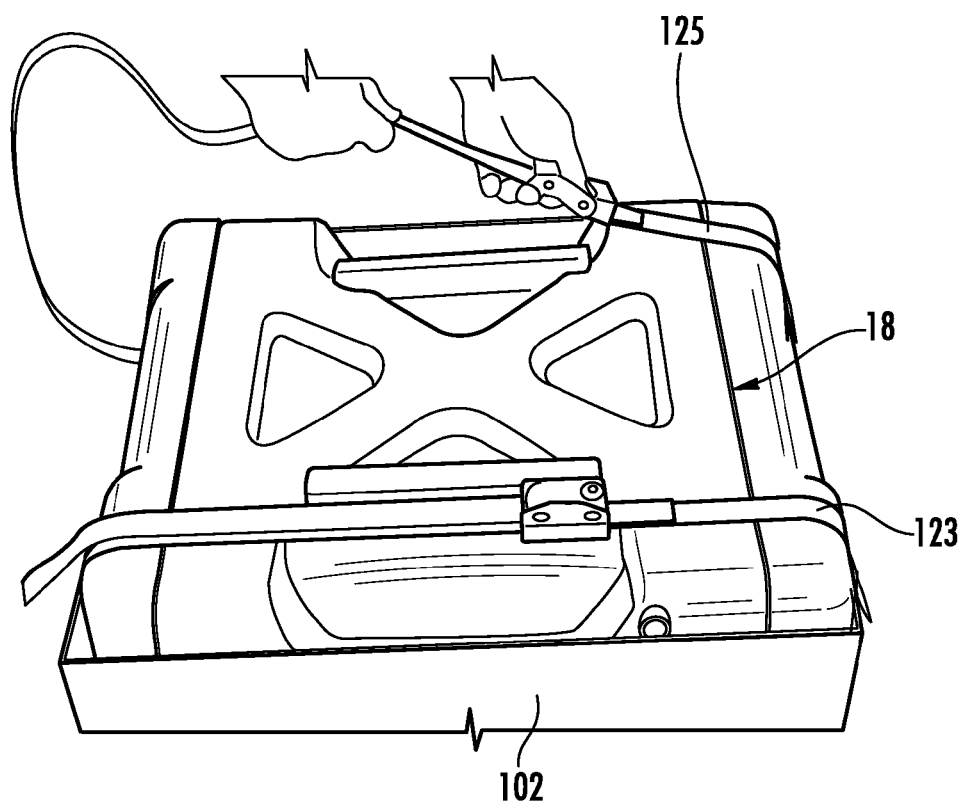
FIG. 8 is an enlarged perspective view of the grip case and a portion of the inside top of the cover of the transport container for securing the grip case in accordance with the embodiment of FIG. 2.
Figure 9:
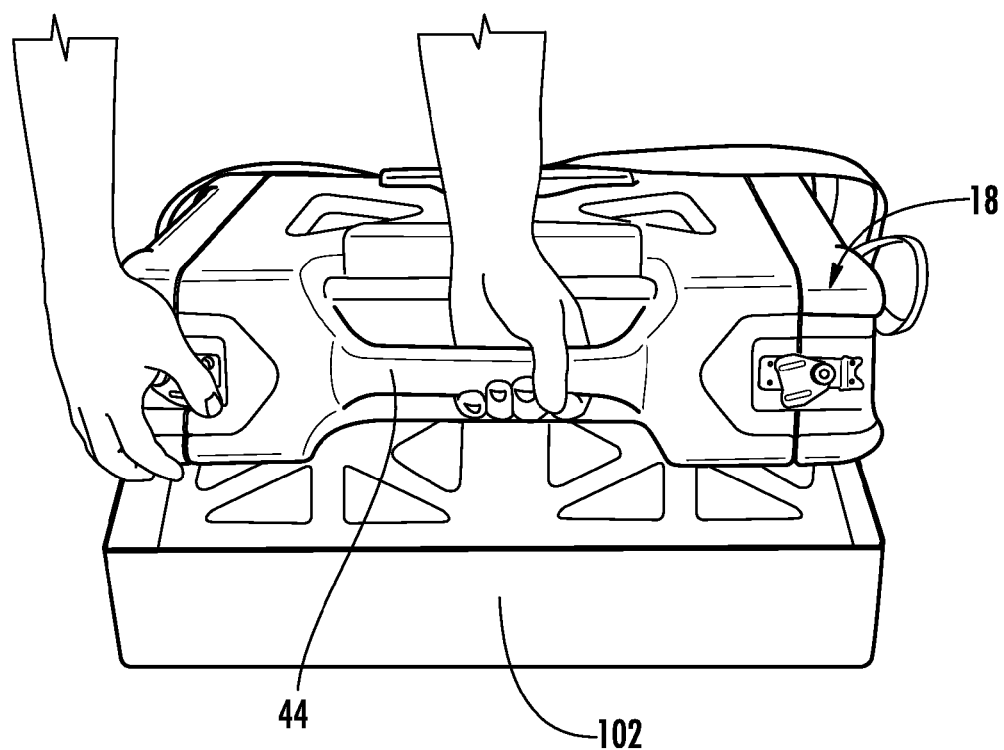
FIG. 9 is a perspective view showing the grip case of FIG. 8 being removed from the transport container.

With reference now to FIGS. 1-9, further details of the transport container 14 will now be provided. FIG. 7A shows the inside of cover 108. Brackets 111 and 113 are mounted to side walls 115 and 117 of cover 108. Brackets 111 and 113 are attached to recess well 102 which receives grip case 18. Recess well 102 rests against the surface 121 of the top of the cover 108. Straps 123 and 125 hold grip case in recess well 102. A panel extension 56 for dish 20 is secured to the surface 121 of the top of cover 108 by a pair of brackets 131 and 133. FIG. 8 is an enlarged perspective view of a portion of the transport container for securing the grip case and FIG. 9 shows the grip case 18 being removed from recess well 102. The transport container 14 is configured as a two piece carry case 100 that includes, as seen in FIG. 2, a cover in the form of open-faced rectangular box 108 and a tray 106 on which certain components of the tray mounted unit 16 can be permanently mounted and can be deployed into the fully deployed position without any need to dismount the tray mounted unit 16 from the mounted disposition. The configuration of the transport container 14 as the two piece carry case 100 also comprises a cover in the form of an open-faced rectangular box 108. The open-faced rectangular box 108 and the tray 106 are releasably securable to one another to thereby configure the two piece carry case 100 as a hard shelled single container operable to receive all of the components of the SatCom terminal 10 for stowage of the SatCom terminal 10 and transport of the SatCom terminal 10. The sled track pair 30 is secured to the tray 106 of the transport container 14. As seen in FIGS. 1 and 2, the transport container 14 includes a left hand set of carry handles 110 and a right hand set of carry handles 110 (only the right hand set is shown) with each carry handle being movable between a retract disposition in which the carry handle is received within a compatibly configured recess formed in the respective right or left outer longitudinal side of the tray 106 and an outward position in which the carry handle can be gripped by a person, in coordination with other people, to lift and carry the transport container. Additional carry handles are provided on the respective end portions of the tray 106.

Overview of the Grip Case

With reference now to FIGS. 8-12, further details of the grip case 18 will be provided. As seen in FIGS. 8 and 9, the grip case 18 can be conveniently and securely moved between a stowed position in which the grip case 18 is stowed within the transport container 14, as shown in FIG. 2, and a fully deployed position, as will be described with respect to FIGS. 10-12. With continued reference to FIGS. 8 and 9, the grip case 18 is configured as a hard shelled carry box having a handle 44 for use as a hand grip by an operator both for stowing and removing the grip case 18 from its stowed position in the transport container 14 and for convenient carrying of the grip case 18 to an operating location. As seen in FIG. 8, the grip case 18 is secured within a rectangular well 102 of the transport container 14 and is secured in a fixed position while seated in the well via a pair of strap down strap assemblies 123 and 125 which pass through loops which extend from the well 102. To release the grip case 18 from its stowed position as shown in FIG. 8, an operator simply unlatches the pair of strap down strap assemblies, grasps the hand grip 44 as shown in FIG. 9, which is a perspective view of the grip case 18 being removed from the transport container 14, and lifts the grip case 18 completely clear of the transport container 14.

Figure 10:
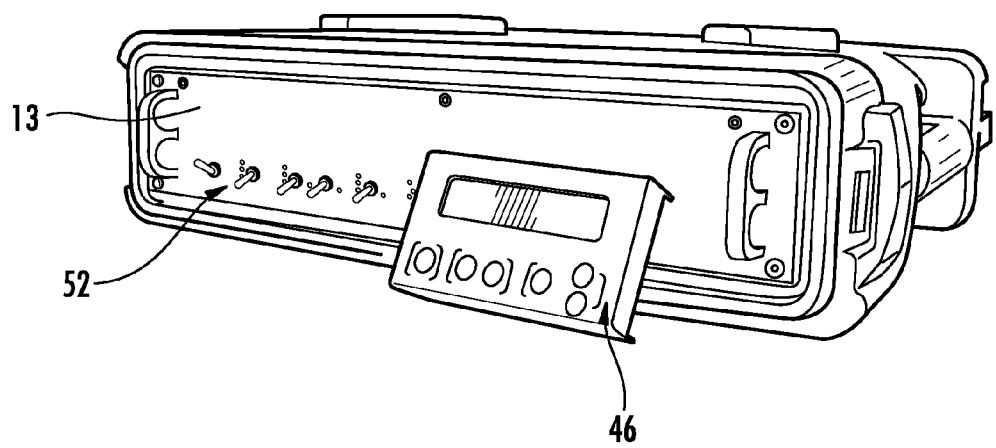
FIG. 10 is a perspective view of a front panel of the power supply and the controller which are received in the grip case.
Figure 11:
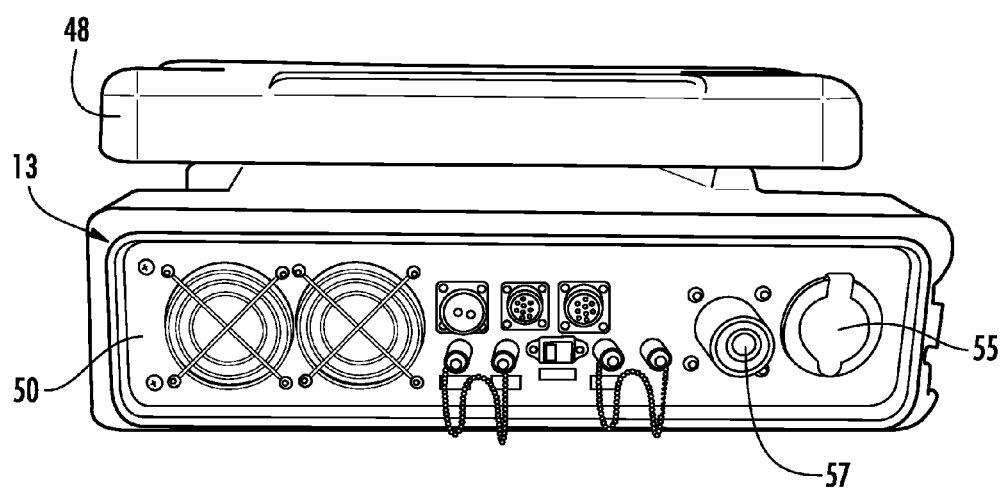
FIG. 11 is a perspective view of the rear of the power supply without cables being connected.
Figure 12:
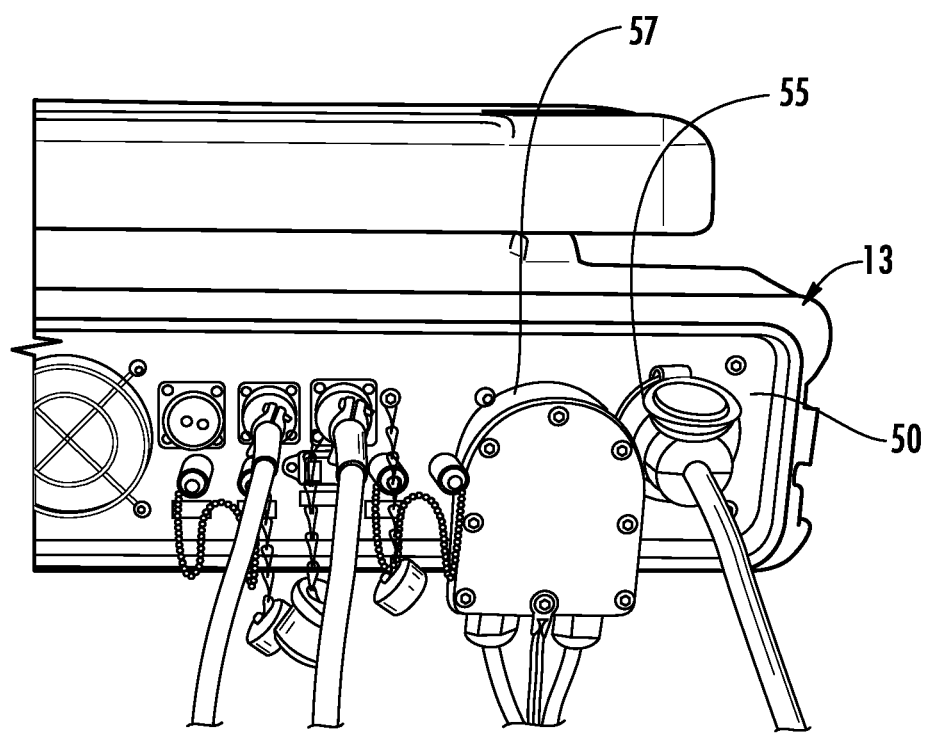
FIG. 12 is a perspective view of a portion of the rear side of the power supply with cables connected.

The grip case 18 houses power supply 13 and controller 46. Power supply 13 is provided with an array of interface connectors for power cord and cable connection of the grip case to the tray mounted unit 16. As seen in FIG. 10, which is a perspective view of a front panel of the power supply, the power supply 13 includes a front panel 52. A handheld antenna controller interface 46 having a graphical user interface (GUI) for convenient and centralized control of the deployment of the SatCom terminal 10 is provided and is electrically connected to the power supply. As seen in FIG. 11, which is a perspective view of the rear side of the power supply 13, a protective rear bookend cover 48 can be removed from the rear of the power supply 13 to expose a rear panel 50 having a plurality of interface connectors. The rear panel 50 of the power supply is preferably clearly marked and color-coded for ease of operation; for example, the "transmit" interfaces may be designated with the color red while the "receive" interfaces may be designated with the color blue. A representative array of connections and interfaces could include: (a) an AC Input 57 (twist lock), (b) a 24-48 VDC Input 55 (slave connector), (c) an Antenna Control System Interface including an RJ11 for handheld and DB9 (2) Controller Comm Interface Ports, (d) two high power BUC power interfaces, (e) LNB power via RF loop-thru, and (f) auxiliary medium power BUC power via RF loop-thru. As seen in FIG. 12, which is a perspective view of a portion of the rear side of the power supply, the power supply 13 can be configured to handle any one of a number of suitable interface cabling arrangements such as, for example a typical Ku-Band system interface cabling which is shown as an AC Input 57 (select primary or secondary), a 24-48 VDC Input 55 (select primary or secondary), Antenna Control System cable, and a BUC power cable connected to the grip case 18. It can thus be understood that the power supply 13 provides a single point of control for the antenna control system and the block upconverter BUC power system supply of the tray mounted unit 16.

Figure 13:
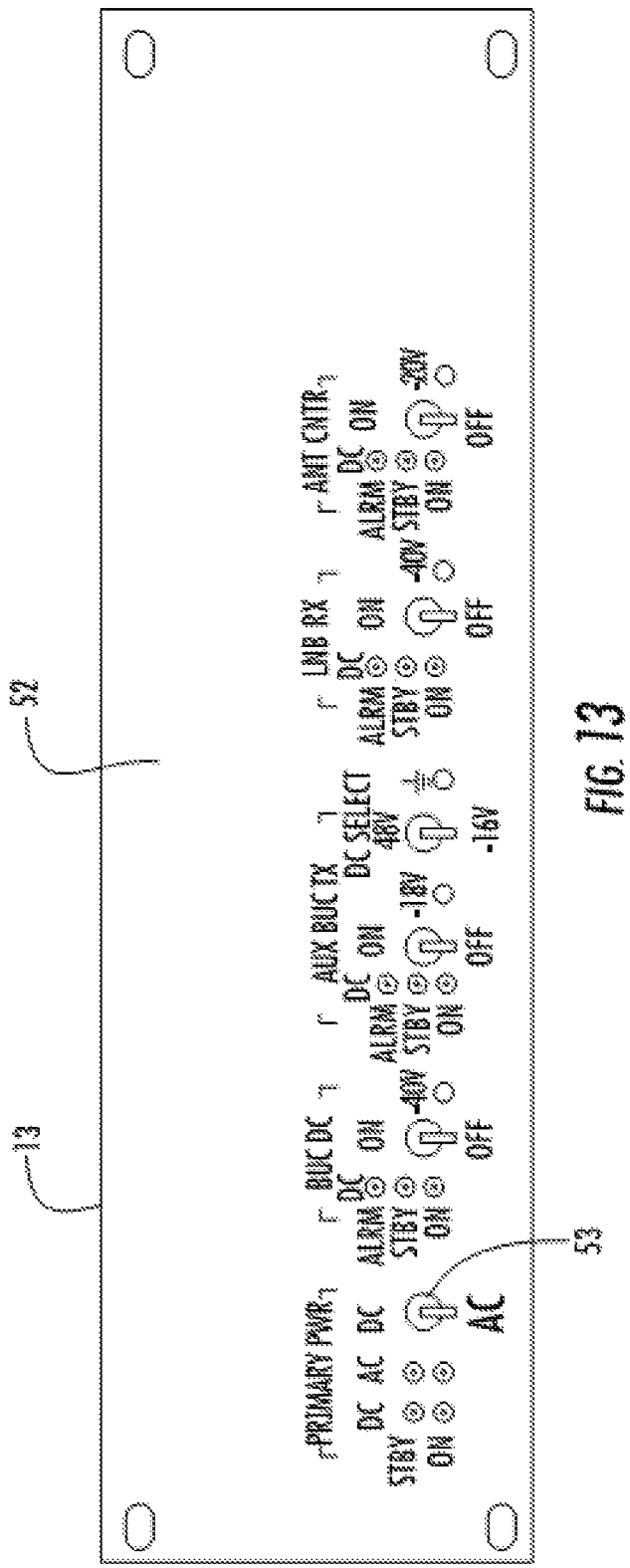
FIG. 13 is a front schematic elevational view of the front panel of the power supply.

As seen in FIG. 13, which is a front schematic elevational view of the front panel 52 of the power supply, the power supply 13 is also operable as a power supply unit for supplying power to the tray mounted unit 16. Primary power is either 19-72 VDC or 100-240 VAC±10%. If both primary power sources are connected by using selection switch 53, the user can select a respective one of the two primary power sources to be enabled as the primary power source and the SatCom terminal 10 will then automatically designate the other primary power source to be in a standby mode and to be available to serve as a backup power source. Thus, if two primary power sources are connected, the power supply unit (PSU) 13 provides an auto-switch capability to automatically toggle between the two primary power sources in the event that the performance of the user-selected preferred primary power source deviates from a predetermined acceptable performance range. If only a single primary source is connected, the power supply unit (PSU) 13 will use the available power source regardless of the selected primary power source switch position.

Figure 20:
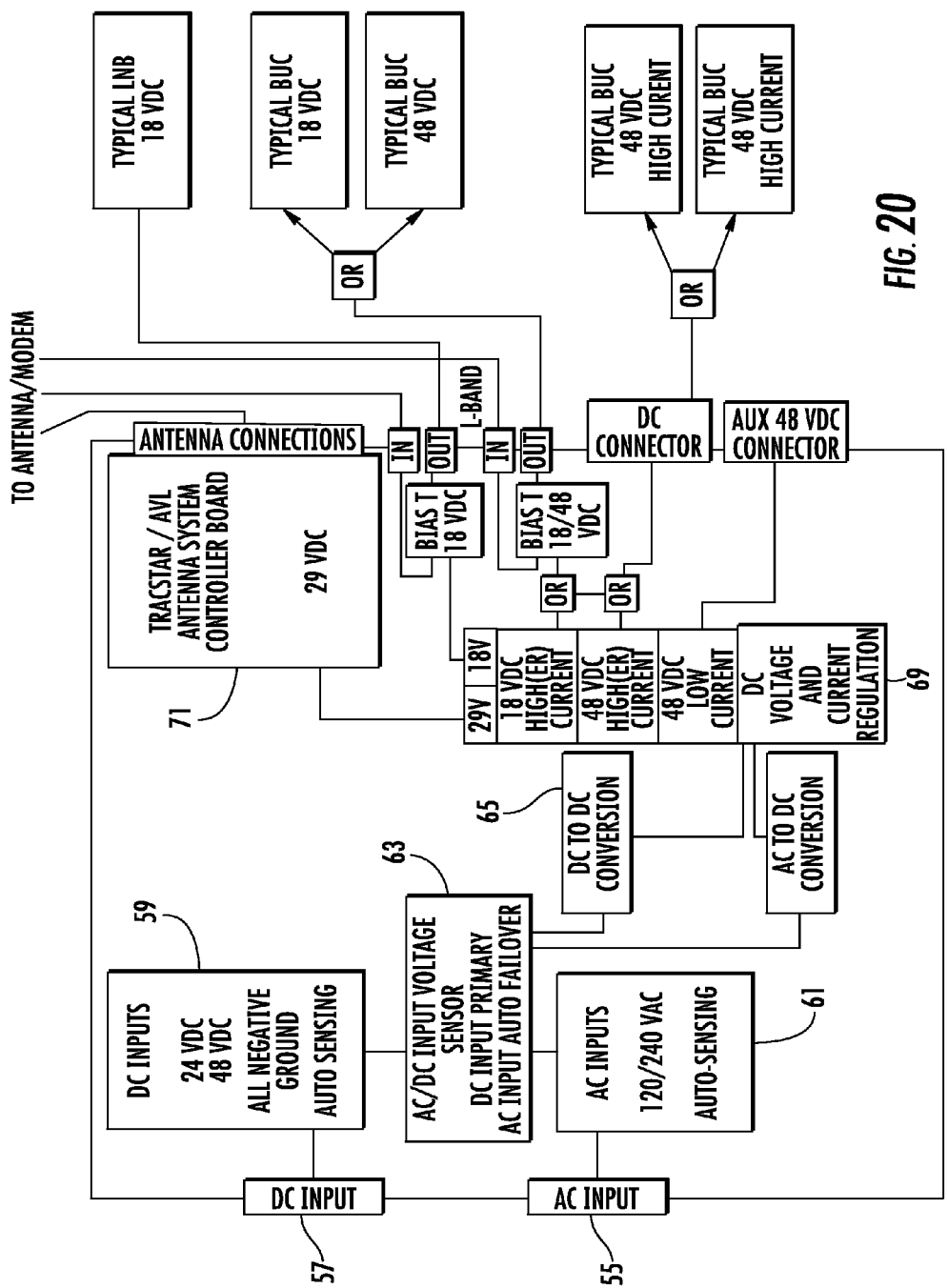
FIG. 20 is a schematic circuit diagram of the power supply.

The flexibility of using either AC or DC power referred to above is accomplished by the use of the circuit shown in FIG. 20. The 2082-1972 DC power supply is a DC voltage power supply used for SSPB (BUC) and LNB applications. DC power is inserted via two L-Band loop-throughs (one LNB and one BUC); and a +48 VDC, 8 A output is provided on the SSPB AUX output connector for high current BUC applications. The two L-Band loop-throughs provide a +18 VDC, 1 A output is provided on the antenna LNB output and either +18 VDC 3 A or +48 VDC 5 A is provided on the antenna BUC output. The unit facilitates the installation of a TracStar antenna controller and provides the +29V 150 W needed with all of the TracStar connectors accessible through the rear panel. Front panel locking toggle switches allow the user to independently disable the DC power on either L-Band loop-through, the SSPB AUX DC output and the TracStar antenna controller. The user is also able to select +18 VDC or +48 VDC insertion on the BUC TX loop-through. Primary power is either 19-72 VDC or 90-264 VDC. If both primary power sources are connected, the user can select which will be enabled and the other source will be put in a standby mode and serve as a backup power source. If only one primary source is connected, the BAT-1214 power supply will use the available power source regardless of the selected primary power source switch position. Each DC power source is fused using rear panel mount fuse holders.

Referring now again to FIG. 20, DC input 57 may receive two different DC voltage levels as illustrated in Block 59, namely, twenty-four volts or forty-eight volts. AC input 55 may receive two different AC voltages as illustrated in Block 61, namely one hundred twenty volts or two hundred forty volts. AC and DC inputs are connected to AC/DC input voltage sensor 63. If the voltage is DC, the DC to DC conversion circuit 65 will convert to the appropriate DC voltage for operating the system. If the input voltage is AC, the AC to DC conversion circuit 67 will convert the AC voltage to DC voltage and to the appropriate DC voltage to operate the system. Circuits 65 and 67 are connected to DC voltage and current regulation circuit 69 which in turn is connected to the antenna's system controller board 71. DC voltage and current regulation circuit 61 is connected to logic circuits for operating the system based on power requirements of the particular system.

As schematically shown in FIG. 13, the front panel 52 of the power supply 13 includes a plurality of actuator elements in the form of locking toggle switches that allow the user to independently disable the DC power on the LNB DC output on its L-Band loop-through, the BUC DC output, the AUX BUC DC output on its L-Band loop-through, or the antenna controller, which may be a TracStar brand antenna controller. Additionally, the front panel 52 may comprise a plurality of light emitting diodes (LED) and these front panel LEDs can be configured to indicate: (a) AC or DC primary power (green) and Standby (yellow), (b) DC output indications for all four outputs (three outputs and a TracStar brand (antenna controller), (c) the output is in a Standby condition (yellow), and (d) an alarm condition which is the result of a blown or missing fuse (red). The alarm condition will only occur if the output is enabled. Additionally, front panel test points are provided for each of the four output voltages and ground. Furthermore, light emitting diodes (LED) colored green can be provided on the front panel 52 and light emitting diodes (LED) colored yellow can be provided on the rear panel 50 to indicate the presence of voltage on any or all of the LNB, BUC, Aux BUC and the TracStar brand antenna controller components.

The grip case 18 is preferably configured as a lightweight integrated transit cased system that houses both the component 46 for controlling the antenna (the antenna controller) and the power supply unit (PSU) 13. For example, the grip case 18 can be configured to house a TracStar brand antenna controller and a PathFinder Digital BAT-1214 brand Power Supply Unit (PSU). When so configured, the power supply 13 and controller 46 housed in grip case 18 provides a single point of control for the antenna control system and the BUC power supply system of the Pathfinder BAT-1214 SatCom Terminal.

Although the power supply 13 can be configured with any number of suitable power inputs, the power supply 13 exemplarily described herein is configured with a dual AC/DC Input. The power supply unit (PSU) 13 can operate via AC or DC power and, if both input sources are connected, the primary source is selectable via a front panel switch on the front panel 52 of the power supply 13. The alternate power source will serve as the back-up. The grip case 18 optionally houses a twist-lock detachable twenty-five foot (25') AC power cord, a twenty-five foot (25') DC power cord set with slave connectors on each end, and a pair of twenty-five foot (25') RG-214 TNC connector equipped Receive and Transmit RF jumper cables to interface with the modem subsystem.

In view of the foregoing description of one embodiment of a mobile satellite terminal, it can be appreciated that, in accordance with the present invention, the SatCom terminal 10 can be provided in the configuration of a custom single case, case-based flyaway auto-acquisition transportable VSAT (MVSAT) SatCom terminal designed for specific higher data rate applications utilizing equipment such as the Network Centric Waveform (NCW) modem and typical L-Band modems. Moreover, the SatCom terminal 10 can be prewired to accept the NCW modem, a MIL-STD 188-165 A compliant FDMA modem, and is capable of interfacing with L-band modems. Furthermore, when configured with an L-3 MPM-1000 NCW modem, any NCW modem, or any MIL-STD 188-165 A compliant FDMA modem, the SatCom terminal 10 can communicate with at least one known version of the US Army WIN-T Increment 1 communications hubs or Trojan NCW hubs.

It can be understood that the convenience and flexibility of the SatCom terminal 10 are engendered by the configuration of the SatCom terminal 10 as an all inclusive system with all components being stored and transported in a single case. The SatCom terminal 10 can be configured with a basic load of components as well as any number of suitable auxiliary components such that the SatCom terminal 10 can comprise an antenna assembly, a hard case power supply unit (PSU) that additionally houses antenna controller components, and RF components, cable kits, accessory kits, and the like. Furthermore, the configuration of the SatCom terminal 10 such that all transmit and receive RF components stay affixed to the antenna assembly while stowed, the system power supply/antenna control system is stowed in a custom bracket inside the case for transport, and all cables and adapters required for system operation are packed and transported within the single case solution all contribute to the convenience and flexibility of the SatCom terminal 10.

It can thus be appreciated that the novel configuration of the SatCom terminal 10 is a user-friendly configuration that facilitates rapid deployment of the SatCom terminal 10 from its transport ready disposition into its fully deployed disposition, whereupon, once power is applied and the communication cables are connected, locating and acquiring the satellite of use is as simple as, for example, (a) pressing a green button on the base of the antenna, (b) pressing a single button on the antenna control systems hand-held controller, or (c) clicking a mouse to access and control a graphical user interface (GUI) of a personal computer (PC) associated with the SatCom terminal 10.

Figure 2A:
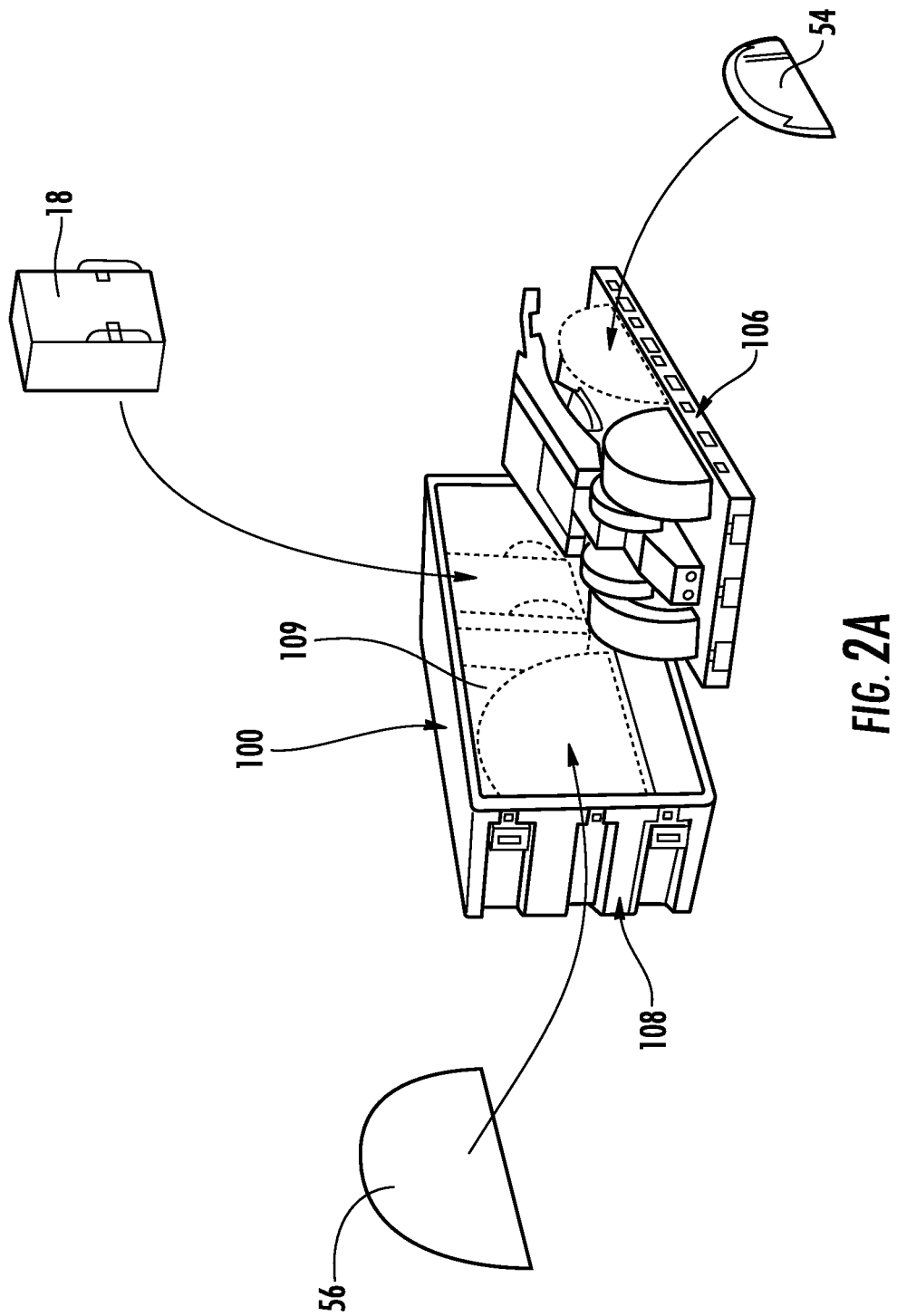
FIG. 2A is a perspective view of the tray portion of the transport container shown in FIG. 2 and showing the mounting location of several components of the SatCom terminal within the transport container.

The SatCom terminal 10 is fully configurable as a Ku/Ka/X band antenna system in which the antenna pedestal, feed boom, and center reflector remain fully assembled at all times. The capability to handle various bands such as any of the Ku/Ka/X bands is provided by configuring the SatCom terminal 10, when deployed into its fully deployed disposition, with the appropriate extender panels affixed to the dish 20. Thus, as seen in FIG. 5, one set of panels 54 are affixed with latches to the dish 20 to create the 1.2 meter aperture for Ka-band operation and another set of extender panels 56 (shown in a stowed disposition in FIG. 2) can be further affixed to render the 1.4 meter aperture for Ku-band operation. The transport container, as shown in FIG. 2, includes stowage area for the set of panels 54. FIG. 2A, which is a perspective view of the transport container shown in FIG. 2, shows the mounting location of several components of the SatCom terminal within the transport container including the mounting location of the grip case 18, the extender panels 54, and the extender panels 56.

Mobility and Transport of the Transport Container

Figure 14:
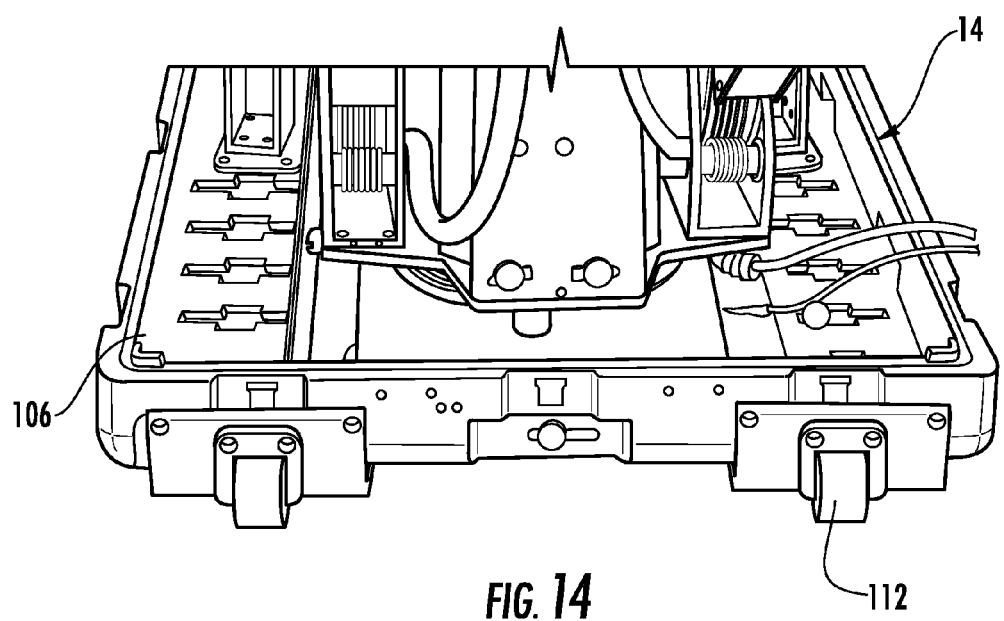
FIG. 14 is a partial perspective view of a portion of the tray of the transport container showing wheels attached thereto.
Figure 15:
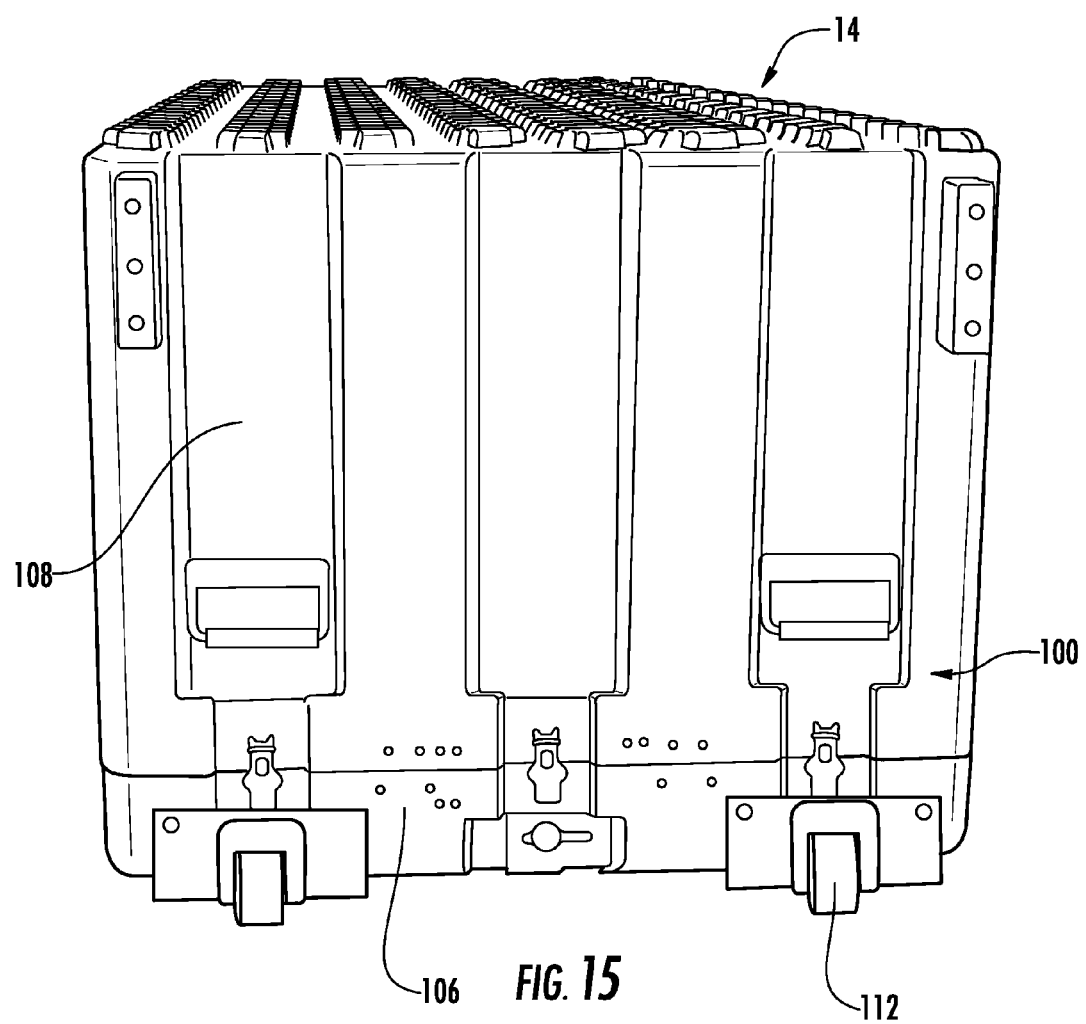
FIG. 15 is a partial end perspective view of the transport container fully assembled and showing the wheels attached thereto.
Figure 16:
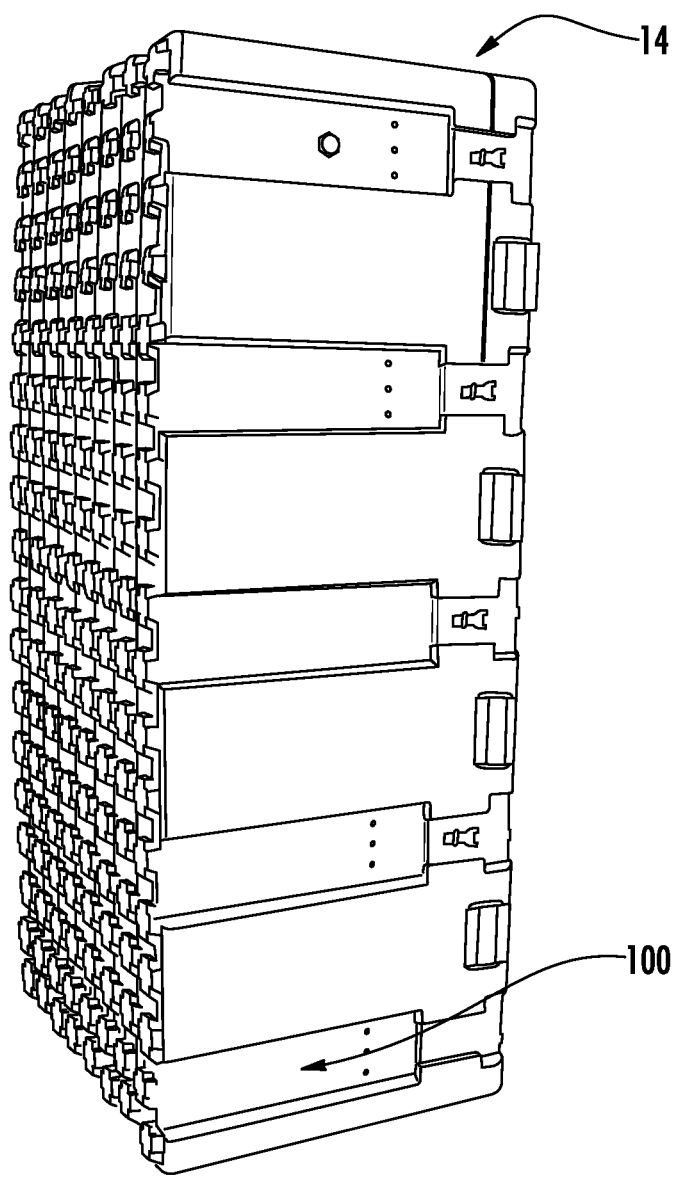
FIG. 16 is a perspective view of the transport container in an upright disposition.

With reference now to FIGS. 14-16, further details of the mobility and transport capabilities of the transport container 14 will now be provided, wherein FIG. 14 is a partial perspective view of a portion of the tray 106 of the transport container showing wheels 112, FIG. 15 is a perspective view of the transport container 108 fully assembled and showing the wheels 112 shown in FIG. 14, and FIG. 16 is a perspective view of the transport container in an upright disposition. The carry handles 110 have already been described and these provide convenient lift, turning, and displacement capabilities. The transport container also includes a pair of wheels 112 rotatably fixedly mounted to one end of the tray 106 and these wheels offer the capability to lift the opposite end of the tray 106 off the ground and thereafter to roll the transport container on the wheels. FIG. 16 illustrates the robust mounting and protection capability of the transport container in that, if the transport container 14 is placed in an upright position, the tray 106 and the thereon mounted tray mounted unit 16 maintain their secured relation to one another even though both are in a vertical disposition.

Example of an Embodiment of the SatCom Terminal with Auxiliary Components

It is contemplated that an exemplary configuration of the SatCom terminal 10 can be provided as a 1.2 Meter/1.4 Meter Convertible Aperture Auto-Acquisition Terminal System, wherein the system includes the following component groups A-E:

Component Group A. PathFinder-BAT-1214 Antenna System: BAT-1214 Auto-Acquisition Case Based 1.2 m/1.4 m Antenna System supplied by AvLTechnologies and comprising the following items:
Single hard case solution
3 axis Roto-Lok brand positioner
Primary 1.2 meter offset fed three piece reflector with two each extender panels to achieve the 1.4 meter aperture
2-Port Ku-Band linear feed to accommodate 10.75 GHz-14.5 GHz transmit & 11.0 GHz to 12.75 GHz receive
One-button auto-acquisition fully automatic satellite acquisition, peaking, and cross-pol adjustment. Certified for auto-commissioning on select services. Includes controller display, power supply, and World Wide Software.
75 ft antenna controller interconnect cables
Feed boom AvL BUC mounting kit Component Group B. Ku-Band-TX-RX-RF-Kit: Communications Electronics Kit comprising:
40 Watt Ku-Band BUC. Extended Ku-Band Range BUC 13.75-14.50 GHz. Compact & lightweight for feed boom mounting on the antenna system.
Ku-Band PLL LNB 10.95-11.7 GHz (10 MHz Ref) CONUS
Ku-Band PLL LNB 11.70-12.2 GHz (10 MHz Ref) OCONUS Component Group C. System Cabling and Interface Ports: Custom L-band interface and sample ports on base of antenna assembly comprising:
50 ohm RF cable assembly
TNC female TX interface port
N female RX interface port
BNC female RX sample port
BNC female TX sample port
Sample ports as integrated are to provide a test point for the L-Band signal at the input of the BUC and output of the LNB.

Component Group D. BAT-CASE-1214: A PathFinder brand lightweight case enclosure for the integration of the BUC/LNB power supply and antenna control unit. Integrated case unit includes the following:
PathFinder BAT-1214 brand BUC/LNB power supply unit
AC/DC power input
Auto-Acquisition antenna control unit
Interface connectors for AC input, DC input, antenna controller, TX, and RX
Forced air ventilation Component Group E. Accessory Kit: Miscellaneous accessories comprising the following items:

Qty 2-25 foot low loss RG214 jumper cables with TNC male straight thru connector on one end and TNC male right angle opposite end 50 ohm connector adapter kit Ratchet style tie down straps Example of a Further Embodiment of the SatCom Terminal It is also contemplated that an exemplary configuration of the SatCom terminal 10 can be provided as a 0.90 Meter Small Aperture Auto-Acquisition Terminal System and, in this connection, the exemplary configuration of the SatCom terminal 10 in the form of a 0.90 Meter Small Aperture Auto-Acquisition Port Ku-Band/Ka-Band SatCom Terminal System will be configurable with a tray portion and power supply unit (PSU) deployable within a transport container wherein these components will have the same overall dimensions as described with respect to the SatCom Terminal 10 disclosed in connection with FIGS. 1-16. Reference is therefore had to the description of the SatCom Terminal 10 disclosed in connection with FIGS. 1-16 for an illustration of the overall dimensions of the transport container. The exemplary configuration of the SatCom terminal 10 in the form of a 0.90 Meter Small Aperture Auto-Acquisition Port Ku-Band/Ka-Band SatCom Terminal System will include features such as a single hard Case Solution, a Power Supply Unit (PSU) with an antenna controller housed in a grip case and operable on both AC and/or DC power, a Ku-Band BUC and Ku-Band LNB(s) mounted on quick release platforms, and low loss RF jumper cables, ratchet straps, and connector adaptors. Also, it is contemplated that the exemplary configuration of the SatCom terminal 10 in the form of a 0.90 Meter Small Aperture Auto-Acquisition Port Ku-Band/Ka-Band SatCom Terminal System will include the following components:

Component Group A. Auto-Acquisition Case Based 750KCB Antenna System supplied by AvLTechnologies and comprising the following items:

Single hard case solution 3 axis Roto-Lok brand positioner 0.90 meter offset fed single piece carbon fiber reflector 2-Port Ku-Band linear feed to accommodate 10.75 GHz-14.5 GHz transmit & 11.0 GHz to 12.75 GHz receive One-button auto-acquisition fully automatic satellite acquisition, peaking, and cross-pol adjustment. Certified for auto-commissioning on select services. Includes controller display, power supply, and World Wide Software.

75 ft antenna controller interconnect cables

Feed Boom BUC mounting kit

Component Group B. Ku-Band-TX-RX-RF-Kit: Communications electronics kit comprising:

16 or 20 Watt Ku-Band BUC. Extended Ku-Band range BUC 13.75-14.50 GHz. Compact & lightweight for feed boom mounting on the 0.75 meter antenna system.

Ku-Band PLL LNB 10.95-11.7 GHz (10 MHz Ref) CONUS

Ku-Band PLL LNB 11.70-12.2 GHz (10 MHz Ref) OCONUS

Component Group C. System Cabling and Interface Ports:

Custom L-Band interface and sample ports on base of antenna assembly comprising:

50 ohm RF cable assembly

TNC female TX interface port

N female RX interface port

BNC female RX sample port

BNC female TX sample port

Sample ports as integrated are to provide a test point for the L-Band signal at the input of the BUC and output of the LNB.

Component Group D. A PathFinder brand lightweight case enclosure for the integration of the BUC/LNB Power Supply and Antenna Control Unit. Integrated case unit includes the following:

PathFinder BAT-1214 brand BUC/LNB power supply unit

Auto-acquisition antenna control unit

Interface connectors for AC input, DC input, antenna controller, TX, and RX

Forced air ventilation

Figure 17:
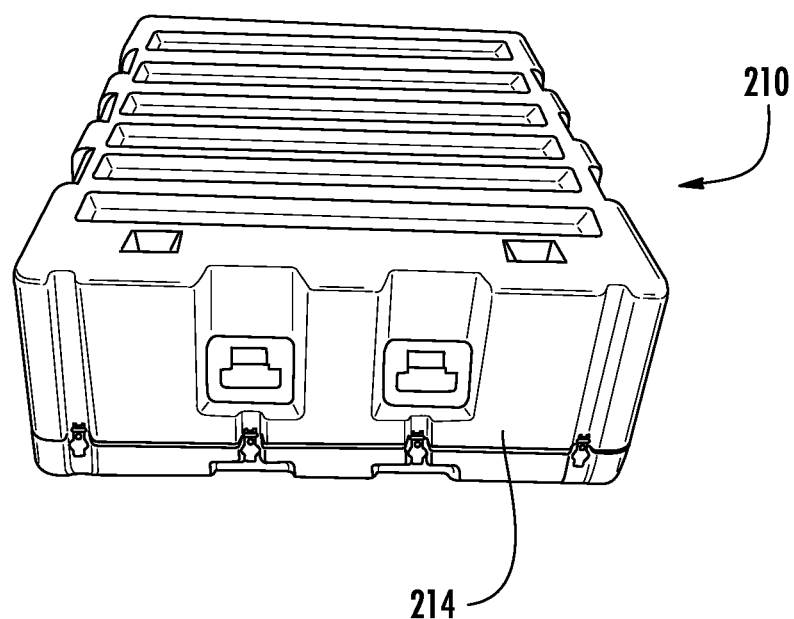
FIG. 17 is a perspective view of a transport container for another embodiment of the invention.
Figure 18:
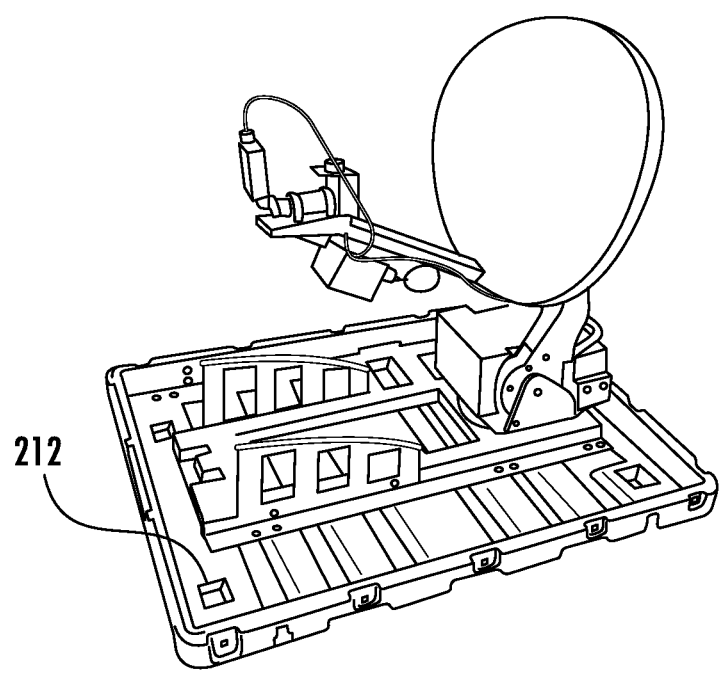
FIG. 18 is a perspective view of the tray mounted unit of the other embodiment for the transport container shown in FIG. 17 with the unit in its fully deployed position.
Figure 19:
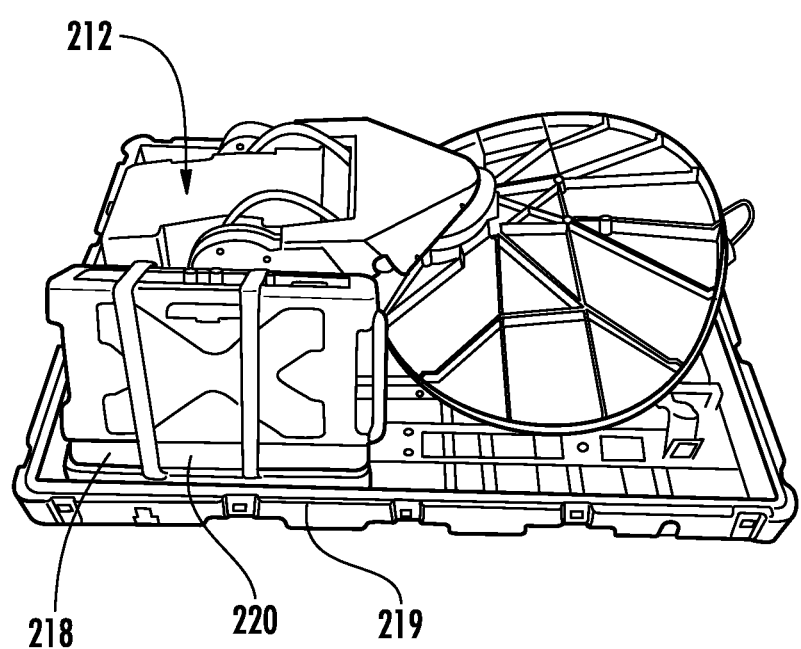
FIG. 19 is a perspective view of the embodiment shown in FIG. 18 with the unit in its stowage position and showing the grip case mounted on the tray unit.
Figure 19A:
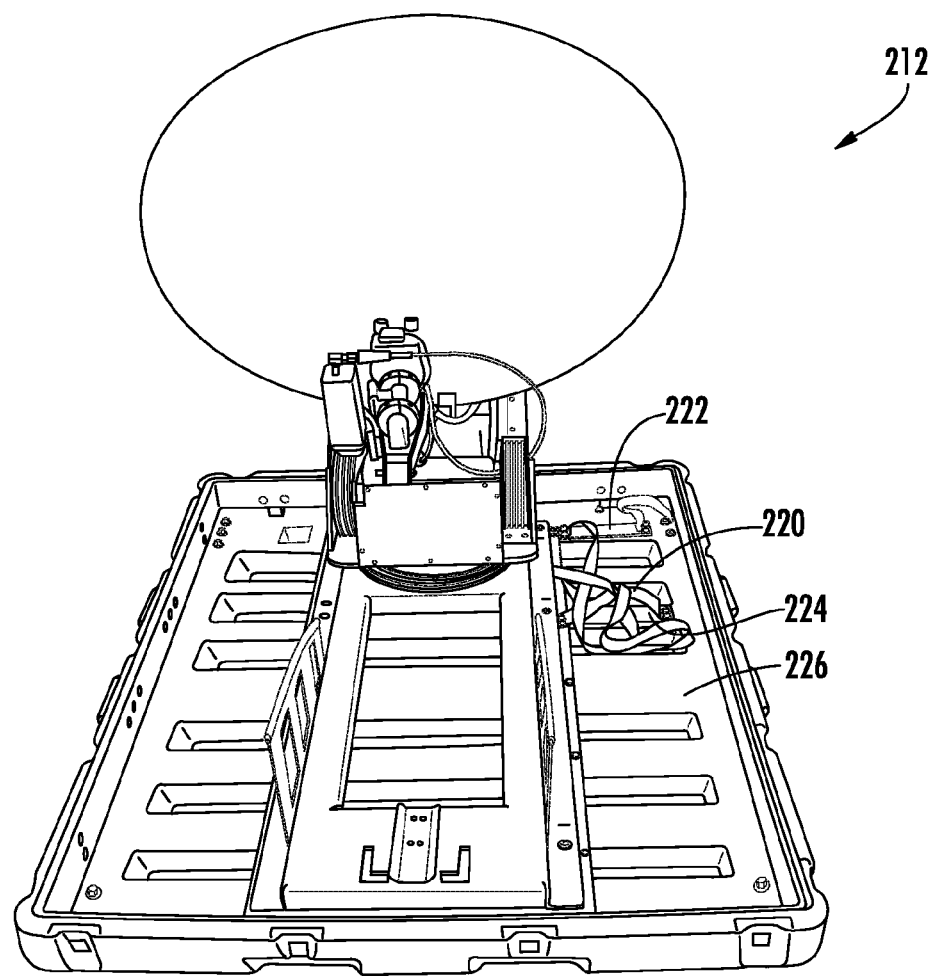
FIG. 19A is a perspective view of the embodiment of FIG. 19 with the unit deployed and with the grip case removed.

Component Group E. Cabling Kit: Interconnect cables to include:

75 foot antenna control cable 75 foot DC BUC power cable 25 foot AC power cord with 120V AC male one end and twist lock female opposite end 25 DC power cable with standard slave connectors each end Component Group F. Accessory Kit: Miscellaneous accessories comprising the following items:

Qty 2-25 foot low loss RG214 jumper cables with TNC male straight thru connector on one end and TNC male right angle opposite end Qty 2-3 foot low loss RF jumper cables with TNC male connectors on each end 50 ohm connector adapter kit Ratchet style tie down straps Example of Another Embodiment of the SatCom Terminal It is also contemplated that an exemplary configuration of the SatCom terminal 10 can be provided as a 0.75 Meter Small Aperture Auto-Acquisition Terminal System and, in this connection, reference is had to FIGS. 17-19A, wherein FIG. 17 is a perspective view of the transport container of this exemplary configuration, FIG. 18 is a perspective view of the tray mounted unit of the transport container shown in FIG. 17 in its fully deployed position, and FIG. 19 is a perspective view of the tray portion of the transport container shown in FIG. 18 in its stowage position and showing the mounting location of several components of the SatCom terminal within the transport container. FIG. 19A is a perspective view of the tray portion of the transport container shown in FIG. 18 in its deployed position wherein the mounting location for the grip case is shown.

With reference now to FIGS. 17-19A, exemplary configuration of the SatCom terminal 10 can be provided as a 0.75 Meter Small Aperture Auto-Acquisition Terminal System is generally designated as a SatCom terminal 210. As seen in FIG. 18, the SatCom terminal 210 includes a transmit/receive sub-system 212 and, as seen in FIG. 18, a transport container 214. The transmit/receive sub-system 212 comprises an antenna dish and feed boom assembly and, as seen in FIG. 19, a combination power supply unit (PSU) and antenna controller assembly housed in grip case 218. Grip case 218 is secured to tray 219 by straps 220. As shown in FIG. 19A, the straps 220 are attached to brackets 222 and 224 which are attached to the bottom 226 of tray 219.

The exemplary configuration of the SatCom terminal 10 in the form of a 0.75 Meter Small Aperture Auto-Acquisition Port Ku-Band SatCom Terminal System will include features such as a single hard Case Solution, a Power Supply Unit (PSU) with an antenna controller, a 20 Watt Ku-Band BUC, CONUS, and extended LNBs, and RF jumper cables and connector adaptors. Also, it is contemplated that the exemplary configuration of the SatCom terminal 10 in the form of a 0.75 Meter Small Aperture Auto-Acquisition Port Ku-Band SatCom Terminal System will include the following components:

Component Group A. Auto-Acquisition Case Based 750KCB Antenna System supplied by AvLTechnologies and comprising the following items:
Single hard case solution
3 axis Roto-Lok brand positioner
89×66 cm offset fed single piece reflector
2-Port Ku-Band linear feed to accommodate 10.75 GHz-14.5 GHz transmit & 11.0 GHz to 12.75 GHz receive
One-button auto-acquisition fully automatic satellite acquisition, peaking, and cross-pol adjustment. Certified for auto-commissioning on select services. Includes controller display, power supply, and World Wide Software.
75 ft antenna controller interconnect cables
Feed Boom AvL BUC mounting kit Component Group B. Ku-Band-TX-RX-RF-Kit: Communications electronics kit comprising:
40 Watt Ku-Band BUC. Extended Ku-Band Range BUC 13.75-14.50 GHz. Compact & lightweight for feed boom mounting on the 0.75 meter antenna system.
Ku-Band PLL LNB 10.95-11.7 GHz (10 MHz Ref)
Ku-Band PLL LNB 11.70-12.2 GHz (10 MHz Ref)

Component Group C. System Cabling and Interface Ports:
Custom L-Band interface and sample ports on base of antenna assembly comprising:
50 ohm RF cable assembly
TNC female TX interface port
N female RX interface port
BNC female RX sample port
BNC female TX sample port
Sample ports as integrated are to provide a test point for the L-Band signal at the input of the BUC and output of the LNB.

Component Group D. BAT-CASE-750: A PathFinder brand lightweight case enclosure for the integration of the BUC/LNB Power Supply and Antenna Control Unit. Integrated case unit includes the following:
PathFinder BAT-750 brand BUC/LNB power supply unit
Auto-acquisition antenna control unit
Interface connectors for AC input, DC input, antenna controller, TX, and RX
Internal filtering and forced air ventilation Component Group E. Accessory Kit: Miscellaneous accessories comprising the following items:
Qty 2-25 foot low loss RG214 jumper cables with TNC male straight thru connector on one end and TNC male right angle opposite end
50 ohm connector adapter kit
Ratchet style tie down straps With respect to the above description then, it is to be realized that the optimum dimensional relationships for the parts of the invention, to include variations in size, materials, shape, form, function and manner of operation, assembly and use, are included, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A mobile satellite communication terminal system comprising:
an antenna dish, a feed boom assembly, a power supply unit and a grip case;
the power supply unit received in the grip case;
a transport container;
the antenna dish, the feed boom assembly, and the grip case received in the transport container whereby the system may be efficiently and conveniently stored, transported, assembled for operation, and disassembled for transport;
the transport container includes a tray forming the bottom of the container and a cover forming the top and sides of the container;
the antenna dish and the feed boom assembly are mounted on the tray;
the grip case is mounted on the inside of the top of the cover;
a well attached to the inside of the top cover; the grip case received and secured in the well; and
first and second brackets attached to the top of the cover; the first and second brackets further attached to the well for securing the well in place.

2. A mobile satellite communication terminal system as set forth in claim 1 further including at least one strap for securing the grip case to the inside of the top of the cover.

3. A mobile satellite communication terminal system as set forth in claim 1 further including a controller; the controller received in the grip case.

4. A mobile satellite communication terminal system as set forth in claim 1 further including a pair of wheels attached to the transport container.

* * * * *